United States Patent [19]

Luce

[11] 3,909,510

[45] Sept. 30, 1975

[54] DIRECT CONNECTION DIGITAL TRANSMISSION APPARATUS

[76] Inventor: David W. Luce, 834 Chautauqua Blvd., Pacific Palasades, Calif. 90272

[22] Filed: Oct. 5, 1973

[21] Appl. No.: 404,025

[52] U.S. Cl. .............. 178/2 R; 178/4.1 R; 178/58 R

[51] Int. Cl.[2] .............. H04L 23/00

[58] Field of Search .............. 178/4.1 R, 58, 2, 2 R, 178/2 A, 3, 4.1 B, 4.1 C, 58 R, 58 A, 68, 88, 79; 179/2 DP

[56] References Cited

UNITED STATES PATENTS

| | | | |
|---|---|---|---|
| 3,496,293 | 2/1970 | Avery et al. | 178/58 |
| 3,505,475 | 4/1970 | Carbone et al. | 178/58 |
| 3,593,293 | 7/1971 | Rorholt | 178/4.1 R |
| 3,617,619 | 11/1971 | Roither et al. | 178/4.1 R |
| 3,684,822 | 8/1972 | Muller | 178/4.1 R |

*Primary Examiner*—Thomas A. Robinson
*Attorney, Agent, or Firm*—John E. Wagner

[57] ABSTRACT

Apparatus is disclosed for interconnecting digital data stations through a transmission medium such as a directly connected unloaded pair of wires. The apparatus transmits data as polarity, or more correctly, direct current reversals on a pair of wires indicative of "ones" (1) and "zeros" (0) or marks and spaces. The apparatus includes means for discriminating against noise spikes which may appear on the line without degrading the quality of valid signals.

Control information is uniquely coded as spaces 0 of predetermined lengths which are distinct from any valid data.

7 Claims, 6 Drawing Figures

DIRECT CONNECTION DIGITAL TRANSMISSION APPARATUS

BACKGROUND OF THE INVENTION

In the field of digital data transmission, there has existed a need for simple but reliable apparatus for connecting a pair of data sources or one source and one utilization device together along with a high degree of control and error detection capabilities. Most interconnecting devices for data sets are designed for either short (a few feet) direct wire connection or switchable or multiplexed operation over telephone lines or networks. There has been a real need which has been largely unrecognized for an interconnecting device for data sets employing dedicated lines which are non switched and unloaded. Given such parameters the transmission characteristics of the line are the controlling limitation.

The need for complex coding of control information or separate control channels is unneeded in such system; however, control for establishing the desired status between the data devices is essential, such as Carrier On, Direction of Data Transmission, and mode such as half or full duplex. Detection of busy, open circuit or other fault conditions is also essential. Heretofore, the classic solution to line length limitation for speech has been to add inductive loading to balance the distributed capacitance of the line. Loading tends however, to distort data signals and therefore is not a satisfactory solution for data channels.

BRIEF STATEMENT OF THE INVENTION

I have developed data transmission apparatus filling these needs and one which generates and transmits control information which is easily segregated from data and accomplishes the necessary control functions without the need for data storage devices.

I have also developed apparatus which utilizes the transmission capability of unloaded twisted pairs far superior than heretofore by a balanced D.C. system of signalling. I further have provided for discrimination against transients without degradation of the signal as is common employing filter techniques.

One feature of this invention resides in the generation of all control information codes as bit sequences which are invalid data codes.

Another features of this invention resides in the generation of various duration 0 bit trains for instituting the required control functions.

One further feature of this invention resides in the data transmitter employing a constant current generator capable of applying equal and opposite currents to each of two conductors and for reversing the current indicative of a change of state of the data.

Still another feature of this invention involves the discrimination against any noise spikes which might appear on the line. A discriminator is included which prevents any pulses of less than a predetermined length from reaching any of the control circuitry without distorting any received data.

REFERENCE TO RELATED INVENTIONS

An improved constant current generator for use in the transmitter portion of this invention is disclosed in my co-pending application, Ser. No. 403,998, filed Oct. 5, 1973.

BRIEF DESCRIPTION OF THE DRAWINGS

A more complete understanding of this invention may be obtained by the following brief description of the drawings in which.

DETAILED DESCRIPTION OF THE INVENTION

Figure 1:
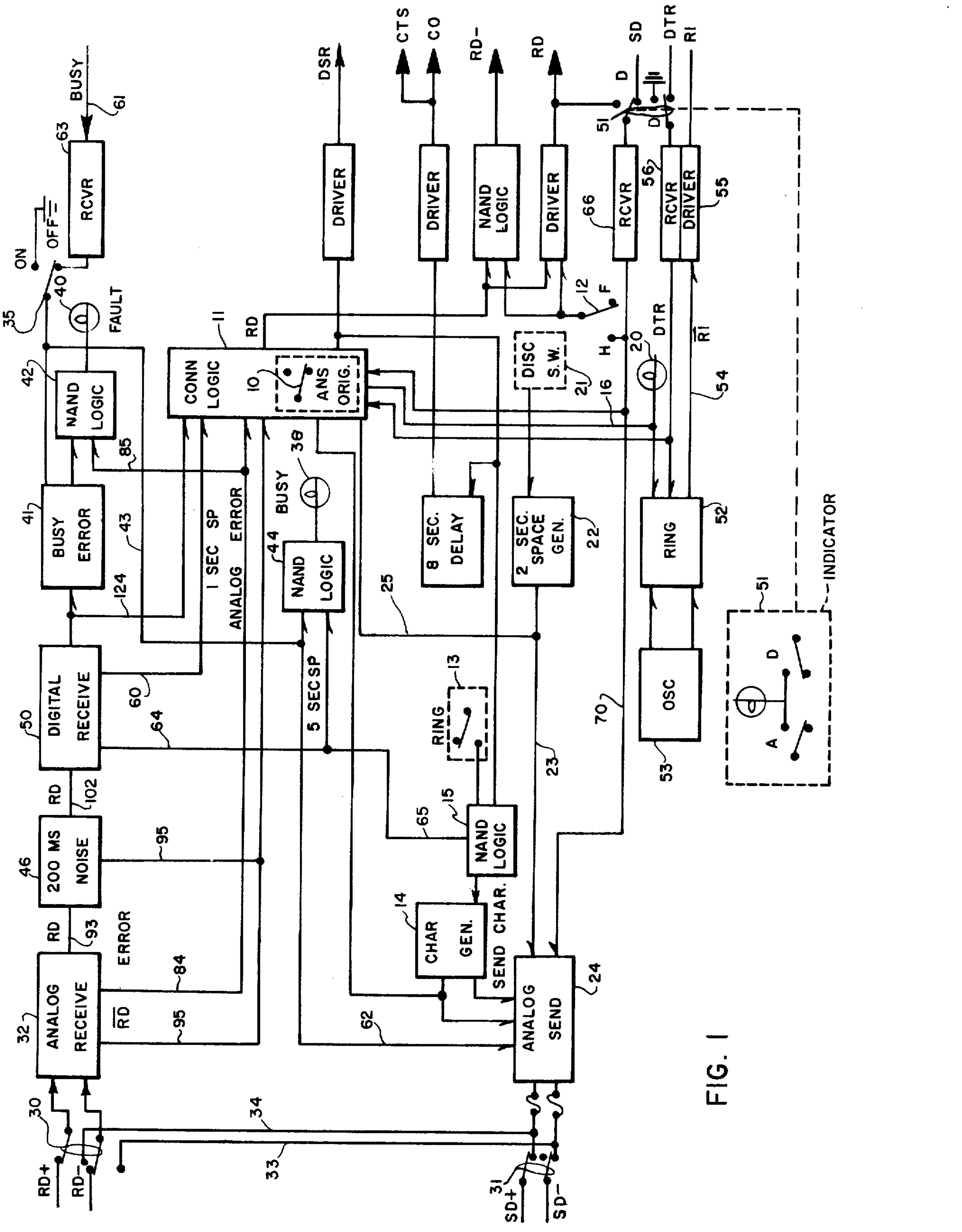
FIG. 1 is a block diagram of the apparatus of this invention.

Now referring to FIG. 1, the signal direction apparatus of this invention is illustrated as connectable to two pair of transmission wires, a first pair identified as Receive Data RD+ and RD−, and a second pair identified as Send Data SD+ and SD−. These pairs, RD and SC constitute the interconnection to similar such apparatus located at a distance eg. 1 to 10 miles on a dedicated non loaded non polarity switched transmission line. Baud rates of 0–2400 are normal depending upon line length.

The apparatus is also connected to a data source/sink which has the following input or output signals to the direction apparatus:

| INPUTS FROM DATA SOURCE | OUTPUTS TO DATA SINK |
|---|---|
| Busy | |
| Data SD | Data RD |
| Data Terminal | Data Set |
| Ready DTR | Ready DSR |
| Ready to | Clear to |
| Send RTS | Send CTS |
| | Carrier On CO |
| | Ring RI |

CONTROLS

Figure 6:
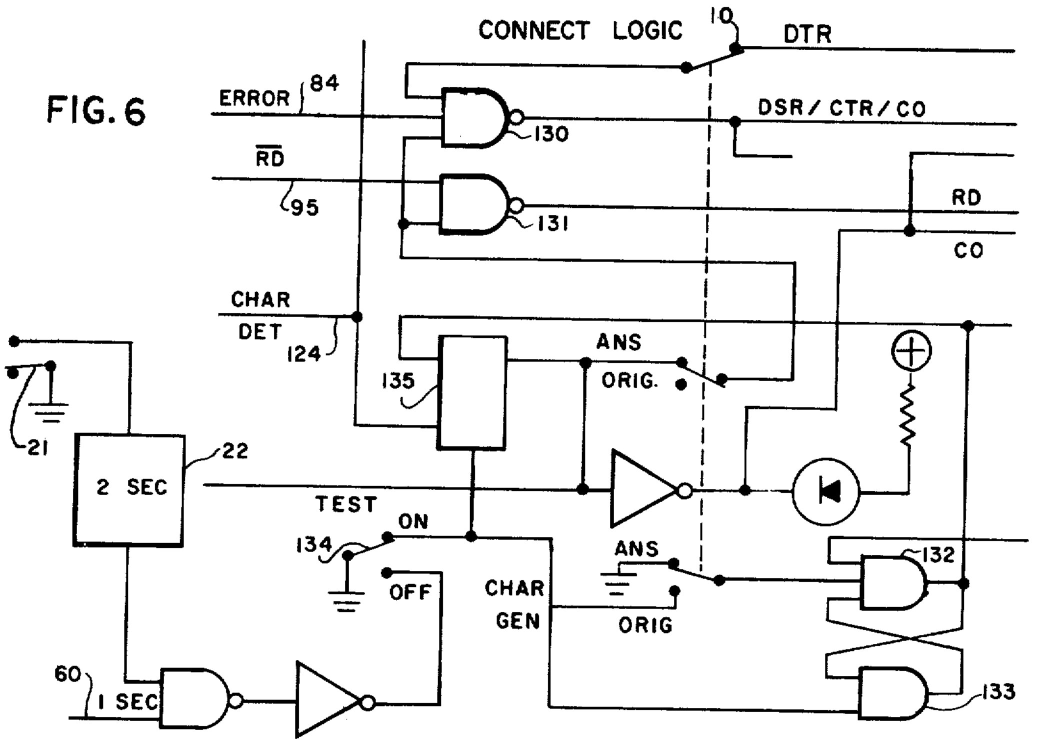
FIG. 6 is an electrical schematic diagram of the connect logic of the apparatus of FIG. 1.

Considering first the controls of the apparatus, it includes in addition to normal power switches, unshown, a basic function ANS/ORIG/Switch 10 which forms a part of the connection logic circuitry 11 of FIGS. 1 and 6. The switch 10, when in the ANS position, conditions the apparatus for receive only operation and when in the ORIG position, the station is the originating or sending station. A similar switch 12 selects the mode of transmission, namely, H (half duplex) or F (full duplex). If the switch 12 is in the H position, the signal direction apparatus of this invention can either transmit or receive data in mutually exclusive time periods. When the switch 12 is set in the F position, it can process, send and receive data simultaneously. The H position of switch 12 can also be used to loop data from send to receive at the local station.

A ring switch 13 is operated to originate a call. It controls a character generator 14 through NAND logic 15 to produce a predetermined signal which is conducted through the communications system, e.g. line conductors SD+ and SD− to the remote station. The preferred code is a character constituting two spaces separated by a mark 010. When the remote computer responds, the corresponding direction apparatus generates a similar character 010 which is detected in the connect logic 11 and via lead 16, illuminates a connected lamp 20.

A disconnect switch 21 is used to disconnect the local station from the remote computer. When this switch 21 is operated, a two second space character is produced in generator 22 and introduced via lead 23 to an analog (ie. transmitted form) send transmitter 24. This signal is also sent via lead 25 to the connect logic circuit 11 where it resets the connect logic and disables the connect light 20.

Two pair of loop switches 30 and 31 interconnect the apparatus to the transmission lines RD and SD respectively. The switch 30 constitutes a double pole double throw switch which alternately connects an analog receive circuit 32 to conductors RD+ and RD— when in the receive condition or to a pair of cross connections 33 and 34 to the analog send circuit 24. When in this alternate position, the apparatus is connected to loop data from a local source back to itself for local printout of its own data. The normal position of switch 30 is as shown connecting the analog receiver circuit to the receive conductors RD+ and RD—.

Other controls include a test switch 35 used to test not only the local station but the loop as well. When actuated and held in the operated condition, a pair of indicator lamps, the busy lamp 36 and the fault lamp 40, are illuminated. The first occurs by applying a ground to a busy error circuit 41, which in turn, through NAND logic circuit, illuminates lamp 40. The same ground signal from switch 35 over lead 43 and NAND logic circuit 44 illuminates busy lamp 36. At the remote station unshown in the drawing but corresponding to the apparatus of FIG. 1 a 5 second timer is triggered by the test signal on lead 43 to analog send circuit 24 and the loop which lights the remote busy indicator and generates a code 010 which is returned over the line to the local station which passes the character through the analog receive circuit 32, a noise discriminator circuit 46 described in FIG. 4, a digital receiver circuit 50, the busy error circuit 41 and NAND logic circuit 42, to deenergize the fault lamp 40. The busy lamp 36, under the direct control of test switch 35, remains illuminated as long as the switch 35 remains operated. If the preceding sequence all occurs as described, the transmission loop is operative.

SYSTEM OPERATION

The apparatus of this invention is basically an asynchronous DC data set which operates at varying baud rates and over ranges of from 1 to 10 miles of unloaded twisted pair common to the telephone plant as dedicated non switched lines.

Operation of this apparatus is best described by following operation sequence while referring to the drawing, FIG. 1. The operator depresses the ring switch 13 which through NAND gate 15, enables character generator 14 to produce a character of two spaces separated by 1 mark (010) which is introduced into the analog send circuit 24 and then via switch 31, to the conductors SD+ and SD—. The comparable apparatus at the remote end illuminates its connected lamp (comparable to 20) after its digital receive circuit (50) detects the code and sends a ring signal RI to its associated computer by operation of its ring logic circuit 52 and ring oscillator 53. The ring signal traverses lead 54 and its driver amplifier 55 to the ring terminal RI connected to its associated computer. If the computer is ready, it applies a high potential to the DTR terminal which in turn causes the Data Set Ready DSR, Carrier On CO and Clear To Send CTS lines to the computer to become "high" or on.

The remote apparatus then generates a character (010) which is transmitted to the originating station, illustrated in FIG. 1. The character received over leads RD+ and RD— and switch 30 is passed through analog receiver 32, noise rejection circuit 46 and detected in the digital receive circuit 50. The detection of a character in digital receive circuit 50 results in the enablement of connect logic 11 over lead 60. Logic circuit 11 in turn illuminates the CONNECTED lamp 20 over lead 16.

If the busy line 61 from the local data device is raised, the busy and fault indicators 36 and 40 are illuminated and a continuous space 0 is applied to the analog send circuit 24 via lead 62 from the test switch 35 and receiver 63. If the remote data apparatus raises a busy line, the remote or ensuing apparatus generates a train of 0s of 5 seconds duration. The local apparatus in the digital receive circuit 50, as described more fully, detects a space of 5 seconds or more and produces a pulse on lead 64 which enables NAND gate 44, illuminating the local busy lamp 36. An enabling pulse is also conducted via leads 64 and 65 to NAND logic 15 triggering character generator 14 to repeat the ring sequence 010. Interrogation will continue until the computer is available.

DATA TRANSMISSION

When the apparatus of this invention, its local data set, the transmission line, the remote apparatus and its computer are operatively connected, data from the data set from terminal SD is conducted via switch 51, a data receiver amplifier 66 and lead 70 to the analog send circuit 24 and to the line conductors SD+ and SD—. Data is transmitted in the form of polarity reversals or more correctly, as reversals in current direction on leads SD+ and SD— with a mark 1 being one direction of current flow and a space 0 the opposite direction of current flow. This is reliably achieved employing the analog send circuit of FIG. 5 which is more fully described in my co-pending application referenced above. Suffice it to say, equal and opposite currents are applied to each conductor SD+ and SD— during a mark 1 and equal and opposite currents are applied to opposite conductors during a space 0.

Figure 5:
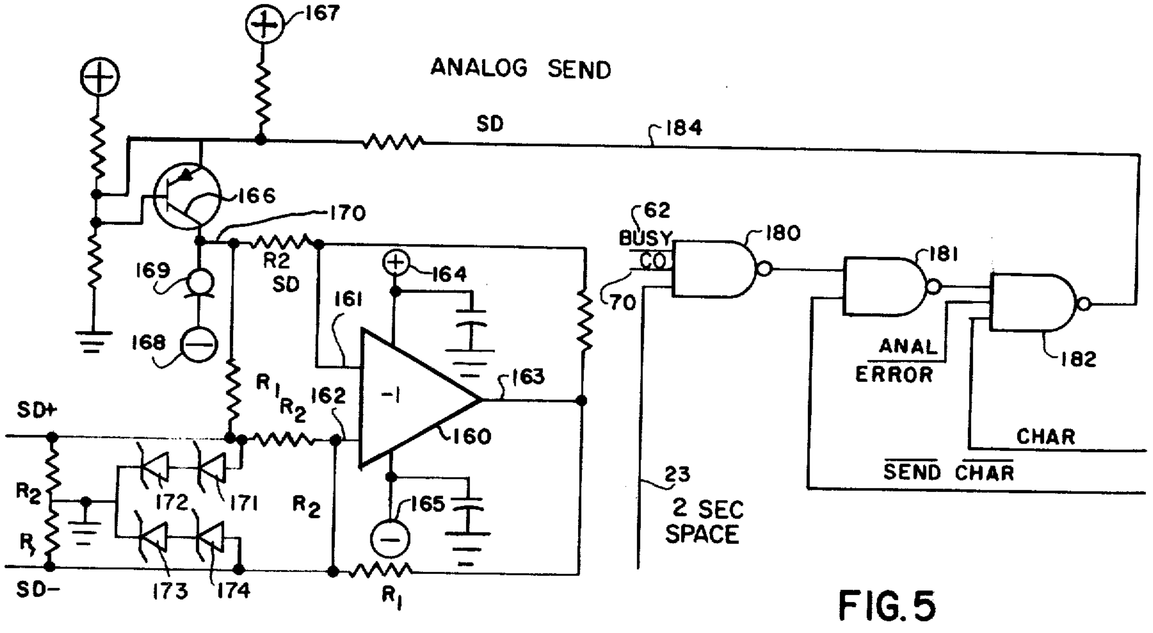
FIG. 5 is an electrical schematic diagram of the analog send circuit of the apparatus of FIG. 1.

Employing the improved transmission capability afforded by the analog send circuit 24 of FIg. 5, reliable transmission is easily accomplished reliably over circuits of twisted pair of 19 gauge conductor at the following rates:

| DATA RATE | RANGE |
|---|---|
| 300 baud | 22 miles |
| 600 baud | 15 miles |
| 1200 baud | 11 miles |
| 2400 baud | 7 miles |

For smaller gauge cable, the range is reduced because of the wire limitations.

ANALOG RECEIVER

Figure 2:
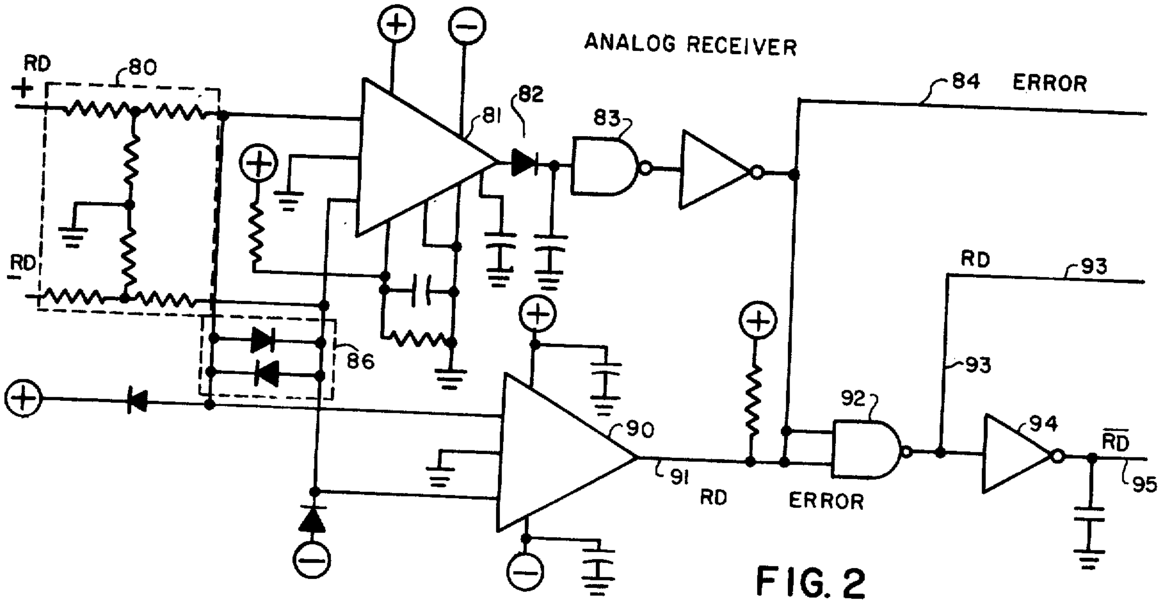
FIG. 2 is an electrical schematic diagram of the analog receiver of the apparatus of FIG. 1.

The receiver 32 as shown in FIG. 2 employs basically a balanced resistance input circuit 80 driving a dual sense amplifier 81, diode 82 and NAND gate 83 which look for the presence of line current. In the absence of line current, a signal on leads 84 and 85 illuminates fault lamp 40. Where line current is present, its direction is determined by a diode network 86 cooperating with amplifier 90, providing an output signal for each mark 1. This signal on lead 91 is applied with the analog error signal on lead 84 to a NAND gate 92 which provides receiver data $\overline{RD}$ on lead 93 and receive data RD through inverter 94 on lead 95.

NOISE REJECTION

Figures 3, 4:
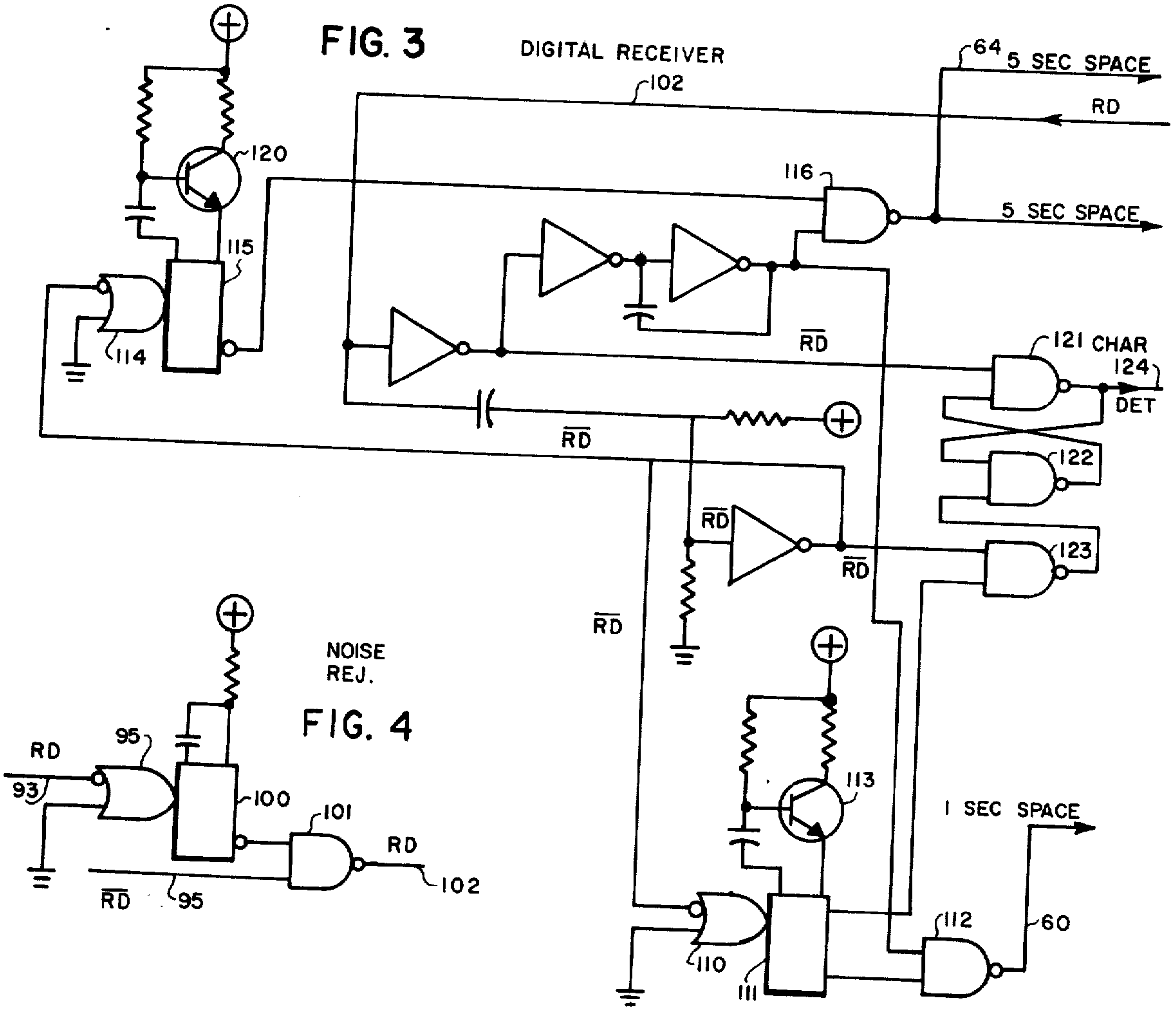
FIG. 3 is an electrical schematic of the digital receiver of the apparatus of this invention.
FIG. 4 is an electrical schematic diagram of the noise rejection circuit of the apparatus of FIG. 1.

Both received data $\overline{RD}$ and received data RD on their respective leads 93 and 95 are applied to noise rejection circuit 46 illustrated in FIG. 4. This circuit employs an OR gate 95 as the trigger input to a retriggerable monostable multivibrator 100 producing an inhibit signal to a quad two input NAND gate 101. If the input signal RD lasts less than a predetermined length of time, eg. 200 microseconds, the multivibrator 100 will be reset and one enabling input to NAND gate 101 removed and the further advance of the pulse on lead 102 is prevented. Short pulses, ie. noise, are therefore isolated from the control apparatus. This circuit rejects noise spikes which may appear on the line RD+ and Rd− but does not degrade the quality of valid data signals which are passed through without the distortion common to filters.

DIGITAL RECEIVER

Received data RD distinguished from noise spikes is applied on lead 102 to digital receiver 50 shown in detail in FIG. 3. This circuit detects:

| | |
|---|---|
| a) connect code | 010 |
| b) disconnect code | 2 second space 0---0 |
| c) busy code | 5 second space 0-----0. |

One second or more space detection is accomplished employing an OR gate 110, retriggerable monostable multivibrator 111, NAND gate 112 and reset transistor 113. Five second spaces are detected by OR gate 114, retriggerable monostable multivibrator 115, NAND gate 116 and reset transistor 120. Three NAND gates 121, 122 and 123 detect a series of two spaces separated by a mark (010) indicative of a received character used to establish connection of the loop, via lead 124 and connect logic 11. since most common data sources such as a teletypewriter, include this sequence in common characters, the commencement of any operation will, when this apparatus is on, send a ring up signal to the remote end and attempt connection.

CONNECT LOGIC

The basic switching functions under the control of manual switches plus incoming characters or spaces are carried out by the connect logic circuitry of FIG. 6. This circuit includes a pair of NAND gates 130 and 131 with inputs ANALOG ERROR on lead 84 and received data $\overline{RD}$ as well as Data Terminal Ready signals DTR and Carrier On CO from the remote station. The NAND gates 130 and 131 pass received data $\overline{RD}$ through to the receiver and additionally, furnish the Data Set Ready DSR, Clear To Send CTS and Carrier On CO signals to the local data set. The connect logic circuit also includes a second pair of NAND gates 132 and 133 under the control of a test switch 35, the original ANS function switch 10 to provide a reset pulse to a monostable multivibrator 135, which is operated when the system connections are complete and ready for transmission.

ANALOG SEND CIRCUIT

One of the features of this apparatus making maximum utilization of the transmission medium is the analog send circuit 24 of FIG. 1 shown in detail in FIG. 5. It employs basically an operational amplifier 160 having a pair of input terminals 161 and 162 and an output terminal 163 and a pair of opposite polarity voltage supplies 164 and 165. Equal value resistances $R_2$ are in series with each input signal path and a resistance $R_1$ shunts the input. Resistance $R_1$ is in the direct current path from a transistor switch which is connected alternately applying positive or negative potentials from sources 167 and 168 to a lead 170 under the control of NAND logic including gates 180–182. The voltage drop across the resistance $R_1$ is a function of the current from the supplies 167 or 168 associated with the transistor switch 166.

The operational amplifier 16 includes two feedback paths, one including a resistance $R_2$ back to input terminal 161 and the other including resistance $R_1$ plus a resistance $R_2$ to provide an unbalanced feedback proportional to resistance $R_1$. With matched resistances $R_1$ at both the input and output, the current on lead SD− is equal and opposite to the current on lead SD+ regardless of loop impedance variations. This driving of both conductors simultaneously provides balanced signals applied to the line and enhanced detection at the remote terminal.

Two pair of back to back Zener diodes 171–174 with their center top grounded provide for shunt lightning or surge protection for the operational amplifier 160.

The analog send circuit, in addition to the generation of line current, includes a three NAND gate 181, 182 and 183 logic circuit which combines control information with data on lead 184. Data and control characters serve to forward or backward bias transistor 166 to apply current to the lines SD+ and SD− from the sources 167 and 168 on lead 170. Source 168 is connected to the line 170 via a constant current source 169 which in fact is a field effect transistor operated as a diode.

SUMMARY

From the foregoing, it may be seen that I have developed a DC data transmission set designed to interconnect remote data devices by simple twisted pairs of conductors while allowing full supervision and control as in complex data transmission systems.

Data is transmitted as current reversals produced by an analog data transmitter. The data transmitter produces equal and opposite currents on the pair of conductors.

The data receiver includes a noise rejection circuit which inhibits the processing of any pulse of length less than one half the shortest pulse length, eg. 200 microseconds, for 2400 baud (pulse length 400 microseconds). The noise rejection responds only to the pulse length and does not affect the amplitude of any valid pulses.

Signalling and the establishment of the connection and disconnection functions is accomplished employing various length spaces and the apparatus includes means for detecting trains of spaces constituting control information. the apparatus provides means for testing both the local loop including the apparatus and the loop including the remote station.

What is claimed is:

1. Apparatus for interconnecting digital equipment to a direct current passing data transmission loop having at least a pair of line conductors cmprising:

a constant line current generator connected to each of said conductors for introducing substantially equal and opposite currents into the respective line conductors forming said loop;

means connecting a source of digital data to control the direction of current flow from said constant current generator to line conductors;

means for generating a code of alternate marks and spaces;

means for generating a plurality of codes of predetermined lengths of spaces indicative of a plurality of control functions; and means for introducing said codes into said connecting means to control the direction of flow of current from said constant current generator to said line conductors.

2. The combination in accordance with claim 1 including means for generating a first code of predetermined length of spaces 0 to denote a disconnect command and means responsive to detection of said code of predetermined length of spaces 0 to disconnect said apparatus from receipt of data from said digital data equipment.

3. The combination in accordance with claim 2 including means for generating a second code of predetermined length of spaces 0 greater than said first code to denote a test function.

4. The combination in accordance with claim 1 including means responsive to the detection of a code of alternate spaces (0) and marks (1) for initiating the connection of said digital data equipment for the reception of data wherein any sequence of received data or signals containing such code will initiate the connection of digital data equipment.

5. The combination in accordance with claim 1 including means responsive to the detection of said codes of predetermined length of spaces 0 for illuminating an indicator lamp.

6. The combination in accordance with claim 1 including receiver means selectively connected to said pair of line conductors, said receiver including a noise discrimination circuit and means for detecting changes in direction of line current indicative of data;

means for detecting an alternating sequence 010 of data or code signals; and means responsive to said last means for generating a signal indicative of connection to a remote station.

7. The combination in accordance with claim 6 wherein said noise discrimination circuit comprises a monostable multivibrator having a period equal to the minimum allowance pulse width:

trigger means for said monostable multivibrator driven by incoming pulses;

first input of a NAND gate connected to the output of said monostable multivibrator; and means for applying inverted incoming pulses to a second output of said NAND gate whereby pulses of less than the period of said monostable multivibrator are blocked from passage through said NAND gate.

* * * * *